(12) United States Patent  
Ford

(10) Patent No.: US 6,237,811 B1
(45) Date of Patent: May 29, 2001

(54) PROGRAMMABLE DISPENSER

(75) Inventor: David F. Ford, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 09/415,469

(22) Filed: Oct. 8, 1999

(51) Int. Cl.[7] ........................................... B67D 5/00
(52) U.S. Cl. .................. 222/129.1; 222/63; 222/129.2; 99/287 R; 99/299
(58) Field of Search ............... 222/63, 129.1–129.4, 222/146.5; 99/289 R, 299; 241/34–36; 426/432, 433

(56) References Cited

U.S. PATENT DOCUMENTS

| 3,964,650 | * | 6/1976 | Lau ........................................ 222/450 |
| 4,313,075 | * | 1/1982 | Stewart et al. ......................... 222/63 |
| 4,535,915 | * | 8/1985 | West ........................................ 222/63 |
| 4,815,633 | * | 3/1989 | Kondo et al. ......................... 222/129.4 |
| 4,993,593 | * | 2/1991 | Fabiano et al. ..................... 222/146.5 |
| 5,087,864 | * | 2/1992 | Abel ........................................ 222/63 |
| 5,134,925 | | 8/1992 | Bunn et al. . |
| 5,186,399 | | 2/1993 | Knepler et al. . |
| 5,230,278 | | 7/1993 | Bunn et al. . |
| 5,255,593 | | 10/1993 | Bunn et al. . |
| 5,285,717 | | 2/1994 | Knepler . |
| 5,303,639 | | 4/1994 | Bunn et al. . |
| 5,309,819 | | 5/1994 | Ford . |
| 5,309,821 | | 5/1994 | Knepler . |
| 5,312,637 | | 5/1994 | Midden . |
| 5,353,963 | * | 10/1994 | Gorski et al. ....................... 222/129.1 |
| 5,372,832 | | 12/1994 | Bunn et al. . |
| 5,375,508 | | 12/1994 | Knepler et al. . |
| 5,386,944 | | 2/1995 | Knepler et al. . |
| 5,393,540 | | 2/1995 | Bunn et al. . |
| 5,422,976 | | 6/1995 | Knepler . |
| 5,462,236 | | 10/1995 | Knepler . |
| 5,465,650 | | 11/1995 | Friedrich et al. . |
| 5,511,465 | | 4/1996 | Friedrich et al. . |
| 5,522,556 | | 6/1996 | Knepler et al. . |
| 5,584,229 | | 12/1996 | Anson . |
| 5,590,532 | | 1/1997 | Bachman . |
| 5,848,728 | * | 12/1998 | Ricciardi ............................... 222/63 |
| 5,927,553 | | 7/1999 | Ford ................................... 222/129.4 |
| 5,992,686 | * | 11/1999 | Cline et al. ........................... 222/63 |

* cited by examiner

Primary Examiner—J. Casimer Jacyna
(74) Attorney, Agent, or Firm—Barnes & Thornburg

(57) ABSTRACT

A programmable dispenser which mixes a substance with water and dispenses a product. In one embodiment, the rate at which substance is dispensed is programmable. The programmable dispenser includes a substance dispensing device which dispenses the substance and a motor which is operably connected to the substance dispensing device. A controller is operably connected to the motor and programmed to operate the motor at a programmed speed to dispense substance at a pre-determined rate. A button is in communication with the controller, and the controller is configured such that the button is actuatable to change the programmed speed to a new programmed speed to provide that the controller subsequently operates the motor at the new programmed speed to provide that the substance dispensing device dispenses substance at a different rate.

13 Claims, 6 Drawing Sheets

PROGRAMMABLE DISPENSER

BACKGROUND

The present invention generally relates to dispensing machines, such as automatic coffee brewers, hot chocolate dispensers and soup dispensers. The present invention more specifically relates to a dispensing machine which can be readily programmed by an end user.

It is advantageous to provide that a dispensing machine, such as a coffee brewer, hot chocolate dispenser or soup dispenser, mixes generally the same amount of substance such as a powdered or syrup beverage concentrate (i.e. coffee grounds, chocolate powder or a soup mix, respectively) into a given serving size. Providing that generally the same amount of substance is mixed into a given serving size results in better product management as well as in a dispensed product which has a predictable taste. For example, if a hot chocolate dispenser mixes generally the same amount of chocolate powder into a given serving size of hot chocolate each time the serving size is dispensed, the taste of the hot chocolate will be generally constant. In contrast, if a hot chocolate dispenser mixes a different amount of chocolate powder into a given serving size of hot chocolate each time the serving size is dispensed, the taste of the hot chocolate will be different each time, and will not be predictable. In addition to providing a more repeatable, predictable taste, dispensing generally the same amount of chocolate powder each time provides that it is easier to predict how many servings a given amount of chocolate powder will produce.

Many commercially-available dispensing machines dispense a pre-determined amount of substance into a given serving size of product. However, such dispensing machines do not generally provide that the pre-determined amount can be readily changed by the end user. However, the end user may want to change the setting so that the machine regularly dispenses a different amount of substance into a given serving size. For example, the end user may wish to re-program a hot chocolate dispensing machine so that it regularly dispenses hot chocolate which is less rich.

It is also advantageous to be able to re-program the amount of product which is dispensed by a dispensing machine when a given dispense button on the machine is pushed. For example, the dispensing machine may provide that pushing a particular button on the front panel of the machine causes the machine to dispense ten ounces of product, and the end user may desire that the machine instead dispense twelve ounces of product upon pushing that particular dispense button. However, dispensing machines do not generally provide that the end user can readily change or re-program serving sizes.

Instead of providing that the end user can readily change programmed settings, such as the amount of substance dispensed into a given serving size or the amount of product which is dispensed at the push of a button, many of the commercially-available dispensing machines provide that a technician must be called to effect the desired changes. As a result, the end user must wait for the technician to arrive in order for the desired changes to be effected. Additionally, such a field call is generally relatively costly.

As discussed above, many commercially-available dispensing machines dispense a pre-determined amount of substance into a given serving size of product. To determine exactly how much substance is being dispensed, it may be necessary to have the dispensing machine dispense a given serving size of product, and then taste the product. Generally, dispensing machines do not provide that the machine can be directed to dispense only substance into a given serving size, where the substance is not mixed with water. However, providing as such would allow an end user to more readily determine how much substance is being dispensed by the machine into a given serving size.

Many commercially-dispensing machines include a plurality of chambers from which substance is dispensed. Typically, the dispensing characteristics of each chamber must be programmed separately. It would be advantageous to provide that an end user can program the dispensing characteristics of one chamber, and then direct the machine to apply the same settings to one or more of the other chambers. Providing as such would save programming time, and would reduce the risk that an incorrect setting is programmed.

OBJECTS AND SUMMARY

A general object of an embodiment of the present invention is to provide a dispensing machine or dispenser which is programmable by the end user.

Another object of an embodiment of the present invention is to provide a dispenser which provides that an end user can program the amount of substance which is dispensed by the dispenser when the dispenser dispenses a given serving size of product.

Still another object of an embodiment of the present invention is to provide a dispenser which provides that an end user can program the amount of product which is dispensed by the dispenser when a given dispense button is pushed.

Still yet another object of an embodiment of the present invention is to provide a dispenser which can be directed to dispense substance dry, unmixed with water, so that an end user can readily determine exactly how much substance is being dispensed by the dispenser into a given serving size of product.

Yet still another object of an embodiment of the present invention is to provide a dispenser which includes a plurality of chambers from which substance is dispensed, and which provides that an end user can program the dispensing characteristics of one chamber, and then direct the dispenser to apply the same settings to one or more of the other chambers.

Briefly, and in accordance with at least one of the foregoing, an embodiment of the present invention envisions a programmable dispenser which mixes a substance with water and dispenses a product. The rate at which substance is dispensed is programmable. The programmable dispenser includes a substance dispensing device which dispenses the substance and a motor which is operably connected to the substance dispensing device. A controller is operably connected to the motor and programmed to operate the motor at a programmed speed to dispense substance at a predetermined rate. A button is in communication with the controller, and the controller is configured such that the button is actuatable to alter the programmed speed to a new programmed speed to provide that the controller subsequently operates the motor at the new programmed speed to provide that the substance dispensing device dispenses substance at a different rate.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which.

DESCRIPTION

Figure 1:
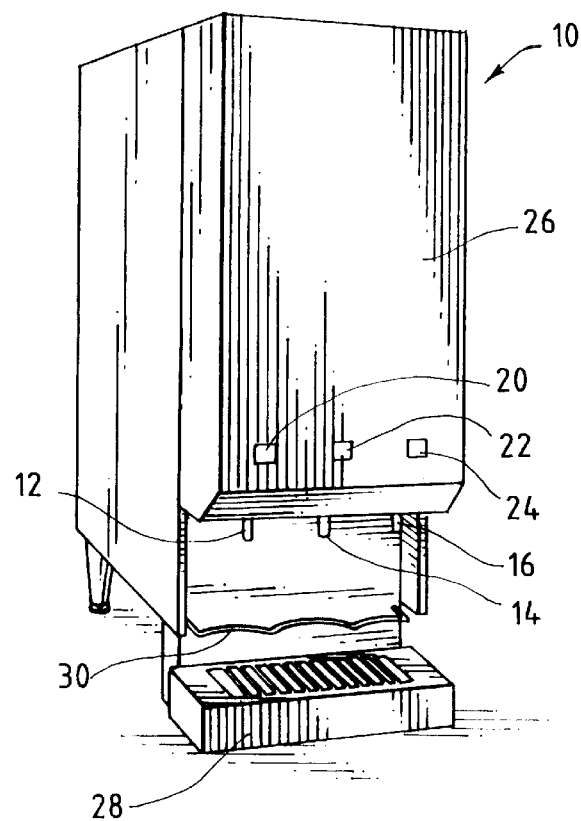
FIG. 1 is a left, perspective view of a programmable dispenser which is in accordance with an embodiment of the present invention.

While the present invention may be susceptible to embodiment in different forms, there are shown in the drawings, and herein will be described in detail, embodiments with the understanding that the present description is to be considered an exemplification of the principles of the invention and is not intended to limit the invention to that as illustrated and described herein.

Illustrated in FIG. 1 is a programmable dispenser or dispensing machine 10 which is in accordance with an embodiment of the present invention. Preferably, the dispensing machine 10 is a fresh mix dispenser, wherein the machine 10 mixes a substance such as a food concentrate in a powder or syrup form with water, such as hot water, and dispenses a resulting, mixed product. The mixed product may be any of several different beverages or soup. For example, the dispensing machine 10 may comprise a coffee dispensing machine, wherein the machine mixes, or brews, coffee grounds with hot water, and dispenses coffee. Alternatively, the dispensing machine 10 comprise a hot chocolate dispenser, wherein the machine mixes, or whips, chocolate powder with hot water, and dispenses hot chocolate. Still further, the dispensing machine 10 may comprise a soup dispenser, wherein the machine mixes a soup mix with hot water, and dispenses hot soup. Of course, the dispensing machine 10 may take still other configurations.

Regardless of what type of product the dispensing machine 10 is configured to dispense, preferably the dispensing machine 10 includes at least one outlet and at least one dispense button or switch associated with each outlet. As shown in FIG. 1, the dispensing machine 10 may include three outlets 12, 14, 16 and a single dispense button 20, 22, 24 associated with each outlet 12, 14, 16. Alternatively, as will be described in connection with another dispensing machine 10a (shown in FIG. 4), the dispensing machine 10 may include a plurality of dispense buttons associated with each outlet. Regardless, the machine 10 is preferably configured such that pushing any one of the dispense buttons 20, 22, 24 associated with a given outlet 12, 14, 16 results in the dispensing machine 10 dispensing product (e.g., coffee, hot chocolate, soup, etc.) from that outlet. Specifically, the dispensing machine 10 shown in FIG. 1 provides that pushing the left-most button 20 results in the machine 10 dispensing product out the left-most outlet 12, pushing the middle button 22 results in the dispensing machine 10 dispensing product out the middle outlet 14, and pushing the right-most button 24 results in the dispensing machine 10 dispensing product out the right-most outlet 16. The machine 10 may be configured to dispense product until a button is released (a manual "push and hold" machine), may be configured to dispense a given serving size of product upon pushing a button, or may be configured to dispense a given serving size of product upon pushing and releasing a button but continue to dispense the product if the button is held down. If the dispensing machine 10 provides multiple dispense buttons associated with each outlet (i.e. the dispensing machine 10a shown in FIG. 4), the dispensing machine 10 may be configured to dispense multiple serving sizes out of each outlet, where a different serving size is associated with each dispense button. Additionally, the machine 10 may be configured to dispense the same type of product from each outlet 12, 14, 16, or may be configured to dispense a different type of product from each outlet 12, 14, 16. Several different configurations are possible.

As discussed above, the dispensing machine 10 shown in FIG. 1 includes three outlets 12, 14, 16 and a single dispense button 20, 22, 24 associated with each outlet 12, 14, 16. As shown, the dispense buttons 20, 22, 24 may be located on a front door 26 of the dispensing machine 10. Preferably, the dispensing machine 10 includes a drip tray assembly 28 which is disposed generally below the outlets 12, 14, 16, and includes one or more container-guiding members 30 which are sized, shaped and positioned generally under the outlets 12, 14, 16 to guide containers under the outlets 12, 14, 16 so that the containers become generally aligned under the outlets 12, 14, 16 for receiving the dispensed product.

Figure 2:
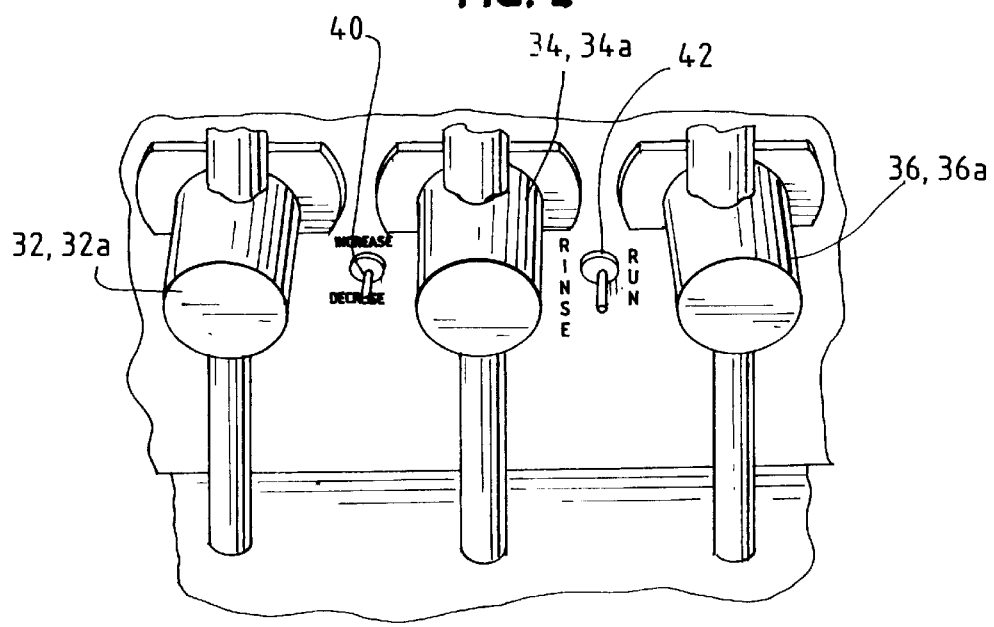
FIG. 2 is a front view of a portion of the programmable dispenser shown in FIG. 1, showing a plurality of switches and mixing assemblies which are located inside a front door of the programmable dispenser.

FIG. 2 illustrates a portion of the machine 10 which is exposed when the front door 26 is open. Preferably, mixing assemblies 32, 34, 36 for each of the outlets 12, 14, 16 become exposed when the door 26 is open, wherein a mixing assembly 32, 34, 36 is associated with each outlet 12, 14, 16. The fact that the mixing assemblies 32, 34, 36 become exposed upon opening the door 26 provides that routine maintenance can be performed on each of the assemblies 32, 34, 36.

As shown, opening the door 26 may also render one or more switches 40, 42 accessible to an end user. Specifically, the switches 40, 42 may include a programmable value changing switch 40 and a mode switch 42. As will be described more fully later herein, the programmable value changing switch 40 provides that a programmable value can be changed, and the mode switch 42 provides that the mode in which the dispensing machine is running can be changed. In FIG. 2, the programmable value changing switch 40 is identified as an "increase/decrease" switch and the mode switch 42 is identified as a "rinse/run" switch, however other configurations are possible.

Preferably, each switch 40, 42 is a three position switch. Specifically, preferably the programmable value changing switch 40 or "increase/decrease" switch has a position for increasing a programmed value (preferably the top setting of the switch), a position for maintaining a programmed value (preferably the middle setting of the switch), and a position for decreasing a programmed value (preferably the bottom setting of the switch). Preferably, the programmable value changing switch 40 or "increase/decrease" switch is biased to the middle position.

Preferably, the mode switch 42 or "rinse/run" switch has a position for operating in rinse mode (preferably the top setting of the switch), a position for operating in program mode (preferably the middle setting of the switch), and a position for operating in normal or run mode (preferably the bottom setting of the switch). Preferably, the mode switch is not biased to any one of the three positions.

Figure 3:
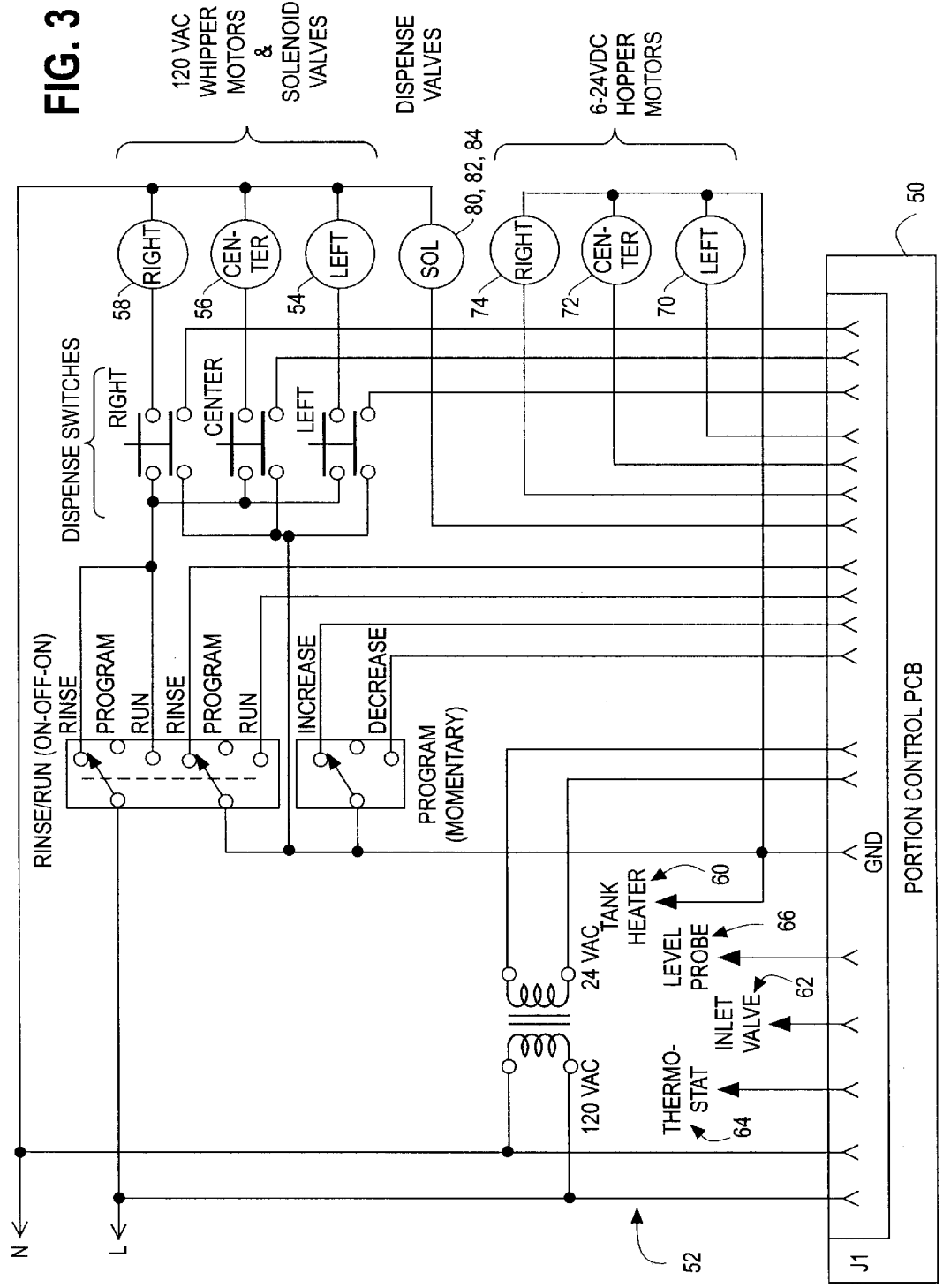
FIG. 3 is a circuit diagram of a control circuit of the programmable dispenser shown in FIG. 1.

As shown in FIG. 3, the dispense buttons 20, 22, 24 on the door 26 of the machine 10 and the switches 40, 42 inside the door 26 of the machine 10 are preferably in communication with a controller 50, and the controller 50, buttons 20, 22, 24 and switches 40, 42 are contained within a control circuit 52 which effectively controls the dispensing machine 10.

Preferably, the control circuit 52 is operably connected to certain devices which operate within the machine 10 to mix, or otherwise prepare, and dispense the product. As shown in FIG. 3, if the machine 10 is configured as such, the controller 50 may be operably connected to a plurality of whipper motors 54, 56, 58 and solenoid valves. Preferably, a whipper motor 54, 56, 58 and solenoid valve is contained in each mixing assembly 32, 34, 36 (see FIG. 2). Therefore, as shown in FIG. 3, the controller 50 of the machine 10 shown in FIG. 1 is preferably operably connected to three whipper motors 54, 56, 58 and solenoids, wherein there is a whipper motor 54, 56, 58 and solenoid valve associated with each of the left, middle and right outlets 12, 14, 16 of the machine 10. Preferably, each whipper motor 54, 56, 58 drives a whipping blade in a respective mixing assembly 32, 34, 36 (see FIG. 2) for mixing water, such as hot water, and a substance such as a coffee mix, a chocolate powder for making hot chocolate, or a soup mix.

Preferably, the dispensing machine 10 includes a tank which receives water from a water line and retains the water therein as a tank heater 60 heats the water in the tank to a pre-determined temperature. As shown in FIG. 3, the controller 50 is preferably operably connected to the tank heater 60 as well as to an inlet valve 62 which is connected to the water line thereby controlling the supply of water to the tank. As shown, preferably the controller 50 is also in communication with a thermostat 64 and a liquid level sensor such as a liquid level probe 66 which are associated with the tank, and the controller 50 operates the tank heater 60 and inlet valve 62 depending on what is detected by the thermostat 64 and liquid level probe 66 to maintain a desirable water temperature and level in the tank. As will be described later herein, the tank is connected to lines which feed the heated water to each of the mixing assemblies 32, 34, 36.

As shown, the controller 50 of the machine 10 is also preferably operably connected to a plurality of motors 70, 72, 74 each of which drives an auger in a respective hopper. Preferably, a hopper is associated with each mixing assembly 32, 34, 36 (see FIG. 2) and each outlet 12, 14, 16 of the machine 10 (see FIGS. 1 and 2), and each hopper carries a substance therein, such as coffee grounds, chocolate powder for making hot chocolate or a soup mix. Therefore, as shown in FIG. 3, the controller 50 of the machine 10 shown in FIG. 1 is preferably operably connected to three auger motors 70, 72, 74, one associated with each of the left, middle and right outlets 12, 14, 16 of the machine 10. Preferably, each motor 70, 72, 74 is a variable speed DC motor, such as a 6–24 Volt variable speed DC motor, and each drives an auger which is disposed in an associated hopper for dispensing substance from the hopper. As will be described later herein, the controller 50 preferably controls the speed of the motors 70, 72, 74 depending on programmed values. Preferably, each auger engages an agitator disk which carries a plurality of wires for agitating the substance, such as chocolate powder, coffee grounds or a soup mix, which is carried in the hopper, thereby preventing clumping in the hopper.

As shown in FIG. 3, preferably the controller 50 is also operably connected to dispense valves 80, 82, 84, wherein each dispense valve 80, 82, 84 is associated with a supply line which runs from the tank to a respective mixing assembly 32, 34, 36. As will be described more fully later herein, the controller 50 is configured to operate the dispense valves 80, 82, 84 and auger motors 70, 72, 74 to dispense hot water and a substance (e.g. coffee grounds, chocolate powder, a soup mix, etc.), respectively, to the mixing assemblies 32, 34, 36 to mix a product and dispense the product from the outlets 12, 14, 16.

While components of the dispensing machine 10, such as the mixing assemblies 32, 34, 36, tank, hoppers, etc. have been briefly described hereinabove, preferably the components are provided consistent with that which is disclosed in U.S. Pat. No. 5,927,553, which provides a much more detailed description of the structure, and which is hereby incorporated herein in its entirety by reference.

Preferably, the controller 50 is configured to achieve at least one object of the present invention. As discussed above, the dispense buttons 20, 22, 24 on the front of the dispensing machine 10 and the switches 40, 42 inside the door 26 of the machine 10 are in communication with the controller 50. Preferably, the controller 50 is configured such that an end user can push the dispense buttons 20, 22, 24 and direct the machine 10 to dispense product from the outlets 12, 14, 16, and can use the switches 40, 42 along with the buttons 20, 22, 24 to program certain dispensing characteristics of the machine 10. While the buttons 20, 22, 24 on the front of the dispensing machine 10 are referred to as "buttons" and the switches 40, 42 inside the door 26 of the machine 10 are referred to as "switches," the buttons 20, 22, 24 may be provided as being switches and vice versa. Additionally, the specific structure, location and quantity of the buttons 20, 22, 24 and switches 40, 42 are not imperative, so long as means for communicating with the controller 50 is provided to allow the end user to program the dispensing characteristics.

Preferably, when the mode switch 42 or "rinse/run" switch is set to the "run" position and an end user pushes, for example, the left dispense button 20, the controller 50 operates the dispense valve 80 which is associated with the left outlet 12 to supply hot water from the tank to the left mixing assembly 32 and operates the respective hopper motor 70 to supply substance from the hopper to the mixing assembly 32. Also, preferably the controller 50 operates the whipper motor 54 in the respective mixing assembly 32. As such, pushing the left dispense button 20 causes the dispensing machine 10 to mix substance and hot water in the left mixing assembly 32, and causes the mixed product to dispense from the left outlet 12. As discussed above, while other configurations are possible, the dispensing machine 10 shown in FIG. 1 is configured to dispense product so long as a dispense button 12, 14 or 16 is pushed, and stops dispensing once the button is released. Specifically, the controller 50 may be configured to first operate the dispense valve 80 to provide water to the mixing assembly 32 and generally simultaneously operate the whipping motor 54 therein. After 650 milliseconds, the controller 50 begins operating the respective hopper motor 70, causing substance to dispense into the mixing assembly 32. Preferably, the controller 50 operates the hopper motor 70 at full speed for a period of time, and then operates the motor 70 at a programmed (or at a default) speed until the button 20 is released. More specifically, the controller 50 may be configured to apply 24 volts to the hopper motor 70 for the first 0.5 seconds of hopper run time, and then apply a programmed (or default) voltage to the hopper motor 70 for the remaining hopper run time. Preferably, the controller 50 operates the other auger motors 72 and 74 in much the same manner.

Preferably, the programmed speeds of the hopper motors 70, 72, 74 can be programmed by the end user using the dispense buttons 20, 22, 24. Changing the programmed speed of a given hopper motor 70, 72, 74 provides that an end user can set the rate at which substance is dispensed into the mixing assembly 32, 34, 36, hence a different amount of substance is dispensed into a given serving size of product. In other words, changing the programmed speed of a hopper motor 70, 72, 74 changes the ratio of substance to water which is dispensed by the machine 10.

For the sake of example, the programming of the left hopper motor speed will now be described. To program the speed of the left hopper motor 70, an end user opens the door 26 and switches the mode switch 42, i.e. the "rinse/run" switch as shown in FIG. 2, to the "program" setting. As discussed above, preferably the "program" setting is the middle setting of the switch. Then, the end user sets the programmable value changing switch 40, i.e. the "increase/decrease" switch as shown in FIG. 2, to either the "increase" or "decrease" setting depending on whether the end user wants to increase or decrease the programmed speed. Next, the end user pushes the left dispense button 20, and as the left dispense button 20 is pushed, the controller 50 increases or decreases (depending on the setting of the "increase/decrease" switch 40) the programmed speed associated with the motor 70 which drives the auger in the left hopper. The same process may be repeated for the remaining hopper motors 72, 74 (i.e. setting the mode switch 42 to the "program" setting, setting the programmable value changing switch 40 to the desired setting, and pushing the middle or right dispense button, 22 or 24, respectively). While a specific button/switch push sequence and configuration has been described, other sequences and configurations are possible.

Preferably, the controller 50 is configured such that an end user can program the speed of one hopper motor and then have the controller 50 apply the same setting to one or more other hopper motors. Specifically, the controller 50 may be configured to provide that, when the mode switch 42 is set to "program," an end user can hold down the dispense button of one hopper, and press one or more of the other dispense buttons to apply the same programmed speed to the other hopper motor(s).

Preferably, the controller 50 is initially programmed with default hopper motor speeds, and different hopper motor speeds can be programmed by the end user as described above. It is also preferred that the controller 50 be configured to provide that an end user can return the settings to the default values. Specifically, the controller 50 may be programmed such that powering the dispensing machine 10 while the left and center dispense buttons, 20 and 22, are pushed and while the mode switch 42 is set to the "program" setting causes the controller 50 to revert back to the default settings.

Preferably, the controller 50 is also configured such that an end user can run a "hopper throw test" wherein the dispensing machine 10 dispenses only substance, where the substance is not mixed with water, for a given period of time. In this way, the end user can readily determine the rate at which the dispensing machine 10 dispenses substance when a given button 20, 22, 24 is pushed. Specifically, the controller 50 may be configured such that switching the mode switch 42 to the "program" setting and pushing and holding down a given dispense button 20, 22, 24 for five seconds while the "increase/decrease" switch is set to the middle (or "neutral") setting causes the controller 50 to operate the respective hopper motor 70, 72, 74 (preferably at full speed at then at the programmed speed) to dispense only substance (not mixed with water) for ten seconds. Of course, this process may be repeated for each dispense button 20, 22, 24 to check the programmed speed of each hopper motor, and verify that the desired amount of substance is being dispensed. If the desired amount of substance is not being dispensed upon pushing a given dispense button 20, 22, 24, the end user may re-program the programmed speed of the respective hopper motor 70, 72, 74, which process has been described above.

Likewise, preferably the controller 50 is configured such that an end user can run the dispensing machine 10 in "rinse" mode, wherein the dispensing machine 10 dispenses only water, where the water is not mixed with substance. Specifically, the controller may be configured such that placing the mode or "rinse/run" switch 42 in the "rinse" position, and then pushing a dispense button 20, 22, 24 causes the controller 50 to operate the respective dispense valve 80, 82, 84 and whipper motor 54, 56, 58 to rinse a mixing chamber of a respective mixing assembly 32, 34, 36 and dispense only water from the respective outlet 12, 14, 16.

As discussed above, a liquid level probe 66 is preferably associated with the tank and is in communication with the controller 50. Although the liquid level probe 66 is preferably initially calibrated at the factory, such as by using a 100K Ohm resistor, preferably the controller 50 is configured such that an end user can readily re-calibrate the liquid level probe 66. Specifically, the controller 50 may be configured such that the liquid level probe 66 becomes re-calibrated upon the end user filling the tank with water, and powering the dispensing machine 10 while pushing the left dispense switch 20 while the mode or "run/rinse" switch 42 is set to the "program" setting.

While a specific button and switch configuration has been described, other configurations are possible. Additionally, while specific switch actuation and button pushing sequences have been described, other sequences are possible. Regardless, by providing that an end user can readily program various dispensing characteristics of the dispensing machine 10, such as the rate at which substance is dispensed from the hoppers, the end user need not call in a technician to effect the desired programming changes. Also, by providing that an end user can direct the dispensing machine 10 to perform a "hopper throw test,", the end user can readily determine if the programmed speeds of any of the hopper motors 70, 72, 74 should be changed. Further, by providing that an end user can program the dispensing characteristics relating to one hopper motor, and then direct the controller to apply the same settings to one or more of the other hopper motors, the end user can save programming time and reduce the likelihood that an incorrect value will be programmed.

Figure 4:
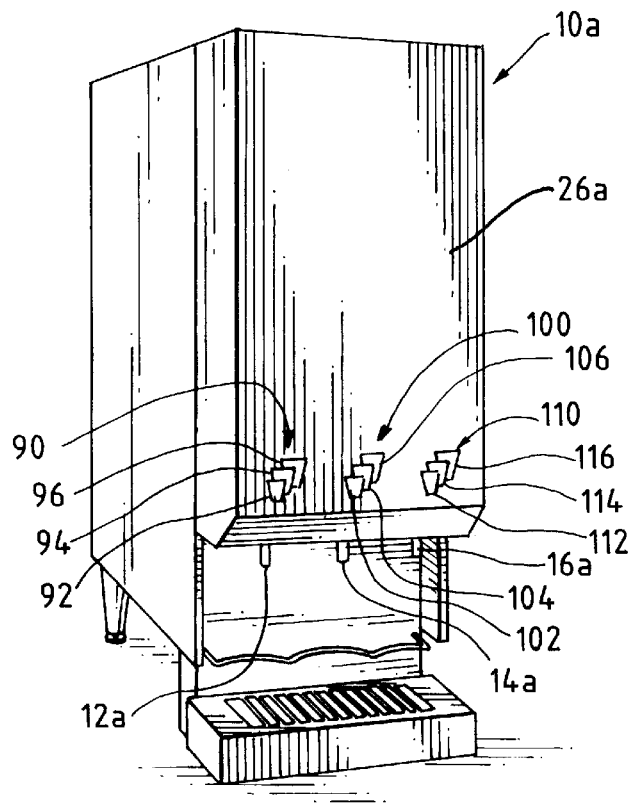
FIG. 4 is a left, perspective view of a programmable dispenser which is in accordance with another embodiment of the present invention.

As discussed, many button and switch configurations are possible. For example, a dispensing machine may be provided which dispenses multiple serving sizes out of each outlet. In fact, the dispensing machine 10a depicted in FIG. 4 is configured as such. FIG. 4 schematically illustrates a programmable dispenser 10a which is in accordance with another embodiment of the present invention. As shown in FIG. 4, the dispenser 10a provides that a set of dispense buttons are associated with each outlet, and that each button corresponds to a different serving size. Specifically, the dispenser 10a provides a set 90 of dispense buttons 92, 94, 96 associated with the left outlet 12a, wherein one dispense button 92 corresponds to a "small" serving size, another dispense button 94 corresponds to a "medium" serving size and still another dispense button 96 corresponds to a "large" serving size. Likewise, the dispenser 10a provides similar sets 100 and 110 of dispense buttons 102, 104, 106, 112, 114, 116 associated with the middle and right outlets 14a and 16a.

Figure 5:
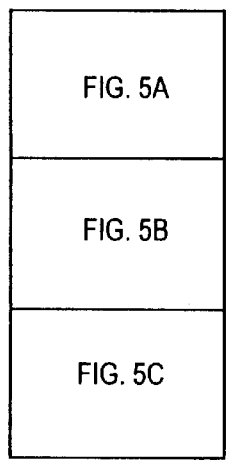
FIG. 5 is a circuit diagram of a control circuit of the programmable dispenser shown in FIG. 4.
Figure 5A:
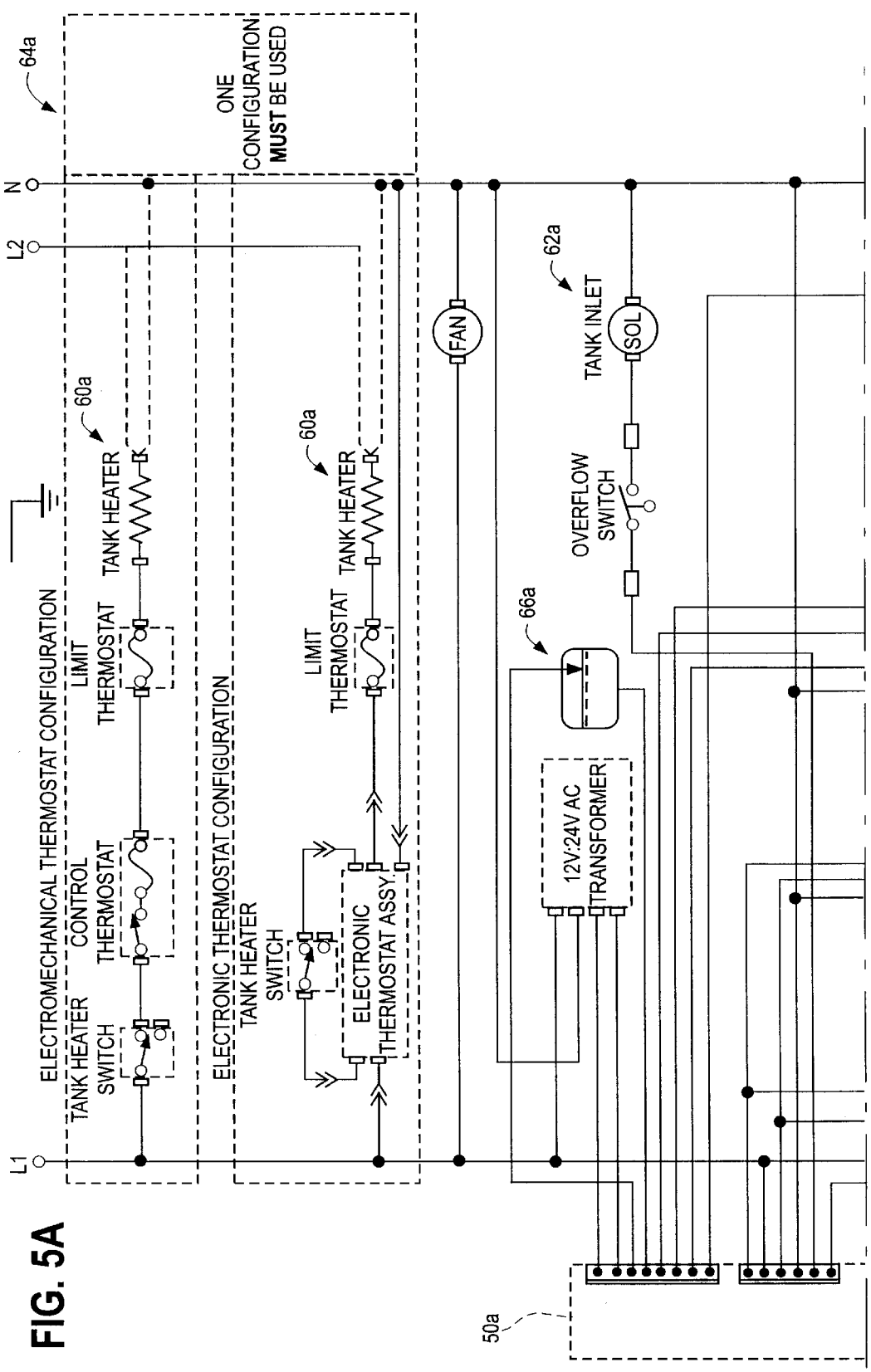
Figure 5B:
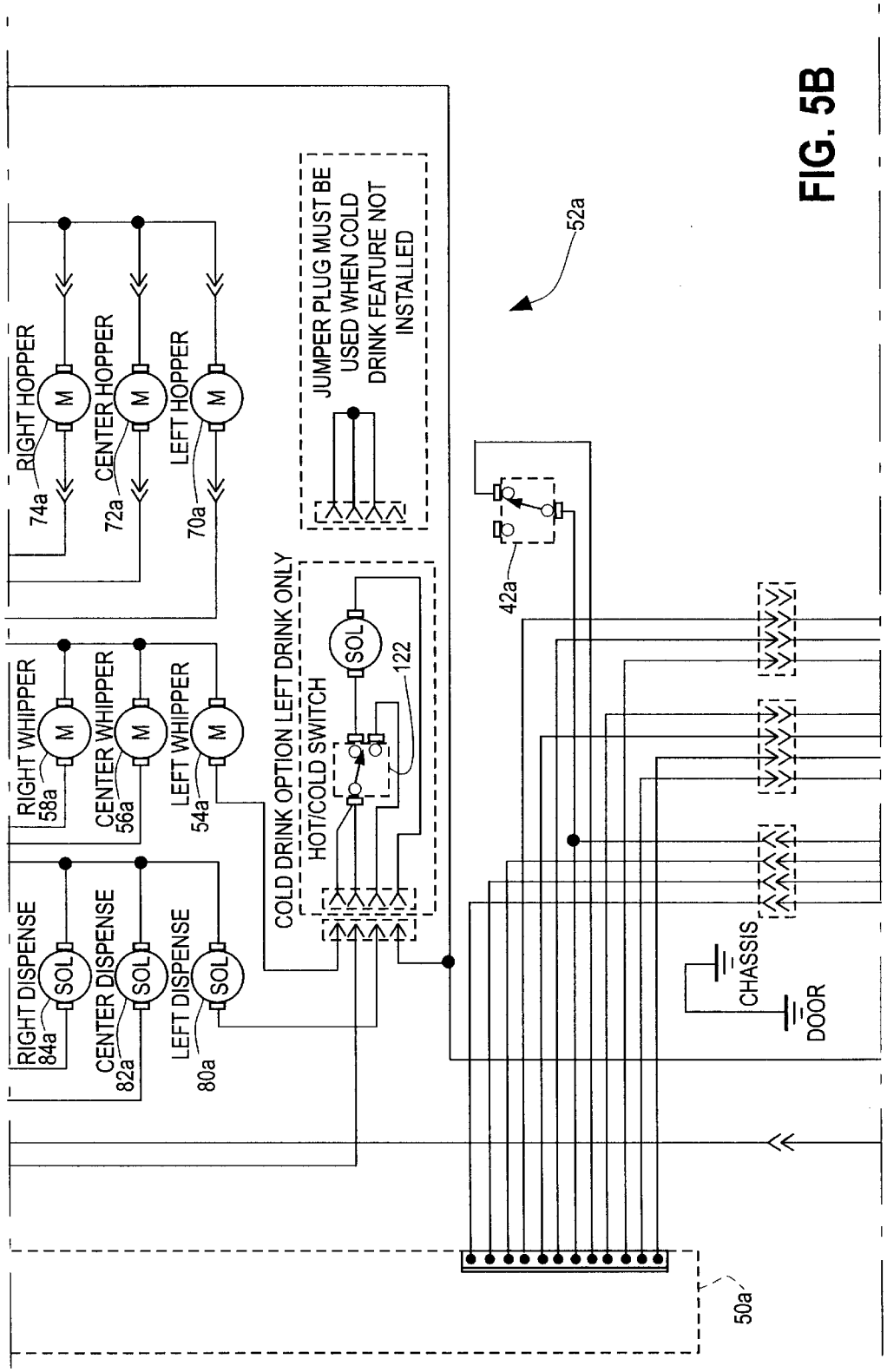
Figure 5C:
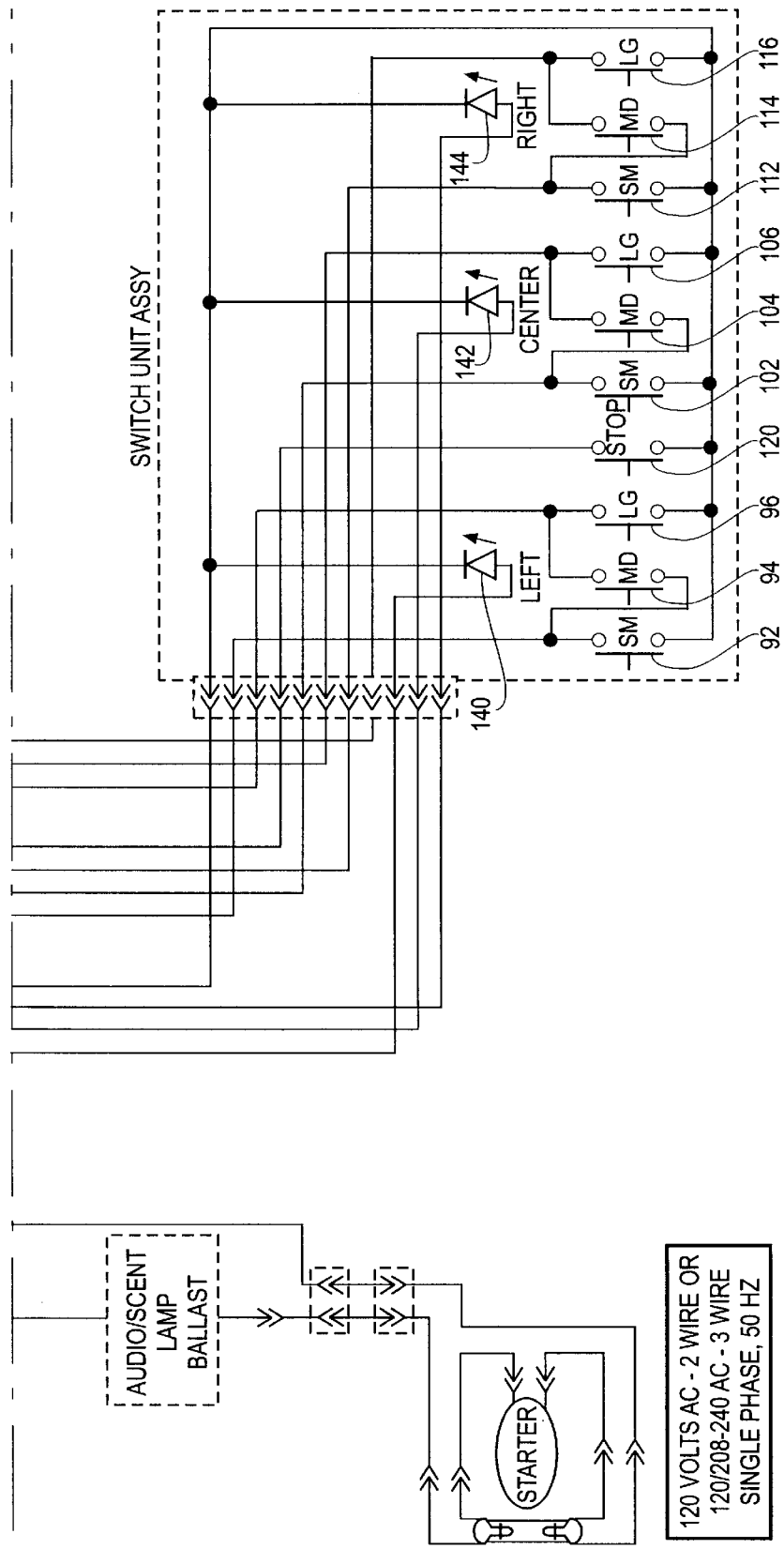

FIG. 5 illustrates a control circuit 52a which is used to control the programmable dispenser 10a. As shown, the control circuit 52a, like the control circuit 52 shown in FIG. 3, is operably connected to a plurality of devices which operate within the machine 10a to mix, or otherwise prepare, and dispense the product. In fact, the devices are similar to those which have been described hereinabove in connection with the programmable dispenser 10 illustrated in FIG. 1. Therefore, similar reference numerals are used to identify similar parts, and the alphabetic suffix "a" is used. Additionally, a detailed description of the structure and functioning of the components are omitted with the understanding that one may review the above description (and U.S. Pat. No. 5,927,553) to obtain an understanding thereof. Much like the control circuit 52 shown in FIG. 3, the control circuit 52a shown in FIG. 5 includes a controller 50a to which is connected an inlet valve 62a of a hot water tank, a thermostat 64a which detects the temperature of the water in the hot water tank, a tank heater 60a, a liquid level probe 66a which detects the level of the water in tank, and a plurality of whipper motors 54a, 56a, 58a and auger motors 70a, 72a, 74a where each whipper motor 54a, 56a, 58a and auger motor 70a, 72a, 74a is associated with a respective mixing assembly 32a, 34a, 36a (mixing assemblies 32a, 34a, 36a are identical to mixing assemblies 32, 34 and 36 illustrated in FIG. 2) and outlet 12a, 14a, 16a (see FIG. 4). As shown in FIG. 5, either a electromechanical or electronic thermostat configuration may be used.

The main difference between the two control circuits 52 and 52a resides in the configuration of the controllers 50 and 50a and the button/switch configurations. As discussed, the programmable dispenser 10a illustrated in FIG. 4 includes a set 90, 100, 110 of dispense buttons 92, 94, 96, 102, 104, 106, 112, 114, 116 for each outlet 12a, 14a, 16a, wherein each dispense button corresponds to a different programmed serving size. Specifically, there is a dispense button for each outlet 12a, 14a, 16a corresponding to a "small" serving size, a "medium" serving size and a "large" serving size. As shown, preferably a "stop" button 120 is also provided.

Preferably, switches 122, 42a are provided inside the door 26a of the programmable dispenser 10a shown in FIG. 4, and these switches 122, 42a are depicted in FIG. 5. Specifically, preferably a water temperature switch 122 or "hot/cold" switch and a mode switch 42a are provided inside the door 26a. However, unlike the mode switch 42 which is provided inside the door 26 of the programmable dispenser 10 shown in FIG. 1 (see FIG. 2) wherein the mode switch 42 provides three settings—one setting for a "rinse" mode, one setting for a "run" mode and one setting for a "program" mode—, the mode switch 42a shown in FIG. 5 provides only two settings—one setting for a "rinse" mode and one setting for a "run" mode—. Although the programmable dispenser 10a illustrated in FIG. 4 can be placed in a "program" mode, this is preferably accomplished by pushing the dispense buttons 92, 94, 96, 102, 104, 106, 112, 114, 116. Specifically, preferably the controller 50a is configured such that the dispenser 10a is placed in "program" mode as a result of an end user simultaneously pushing any two dispense buttons associated with a given outlet 12a, 14a, 16a. Additionally, preferably the controller 50a is configured such that the dispenser 10a exits "program" mode when any dispense button that is associated with a different outlet is pushed. Preferably, the dispenser 10a illustrated in FIG. 4 also provides that a password must be entered using one or more dispense buttons in order to prevent unauthorized programming.

Preferably, when the mode switch 42a or "rinse/run" switch is set to the "run" position and an end user pushes, for example, the dispense button 90 corresponding to a small serving size dispensed from the left outlet 12a, the controller 50a operates the dispense valve 80a which is associated with the left outlet 12a, to supply hot water from the tank (or cold water from the supply line if the water temperature switch 122 is set to the "cold" position) to the left mixing assembly 32a and operates the respective hopper motor 70a to supply substance from the hopper to the mixing assembly 32a. Also, preferably the controller 50a operates the whipper motor 54a in the mixing assembly 32a. As such, pushing dispense button 90 causes the dispensing machine 10a to mix substance and water in the left mixing assembly 32a, and causes the mixed product to dispense from the left outlet 12a. As discussed above, the dispensing machine 10a shown in FIG. 4, and the controller 50a shown in FIG. 5, is configured to dispense a programmed serving size of product when a given dispense button is pushed. Specifically, the controller 50a may be configured to first operate the dispense valve 80a to provide water to the mixing assembly 32a and generally simultaneously operate the whipping motor 54a therein. After 650 milliseconds, the controller 50a begins operating the respective hopper motor 70a, causing substance to dispense into the mixing assembly 32a. Preferably, the controller 50a operates the hopper motor 70a at full speed for a period of time, and then operates the motor 70a at a programmed (or at a default) speed until the programmed serving size has been dispensed. More specifically, the controller 50a may be configured to apply 24 volts to the hopper motor 70a for the first 0.5 seconds of hopper run time, and then apply a programmed (or default) voltage to the hopper motor 70a for the remaining hopper run time. Preferably, the controller operates the other auger motors 72a, 74a in much the same manner upon the pushing of dispensing buttons 102, 104, 106, 112, 114, 116.

Although it is preferred that the programmable dispenser 10a be initially provided with pre-programmed serving sizes for each of the dispense buttons 92, 94, 96, 102, 104, 106, 112, 114, 116, preferably the controller 50a is configured such that an end user can change the settings. Preferably, the programmed serving sizes can be programmed by an end user using the dispense buttons 92, 94, 96, 102, 104, 106, 112, 114, 116. First, the end user places the dispenser 10a in "program" mode (by pushing any two dispense buttons associated with a given outlet, as described above). Then, the end user places the mode switch 42a or "rinse/run" switch in the "run" position and pushes and holds down the dispense button to be programmed. As the end user pushes and holds down the dispense button, the controller 50a operates the dispense valve 80a, 82a or 84a and hopper motor 70a, 72a or 74a associated with that dispense button, and product is dispensed out the associated outlet 12a, 14a or 16a. When the desired amount of product has been dispensed, the end user releases the dispense button, and the length of time that the dispense button was held down is stored in the memory of the controller. The end user may then direct the dispenser to exit the "program" mode (by pushing a dispense button that is associated with any of the other outlets, as described above). Subsequently, when that particular dispense button is pushed (while the dispenser is in "run" mode), the dispenser 10a dispenses generally the same amount of the product which was dispensed while the end user was holding down the dispense button while programming it. Of course, the same process can be repeated for the other dispense buttons.

Once the serving sizes of each of the dispense buttons in a given set 90, 100 or 110 have been programmed (e.g. "small", "medium" and "large"), preferably the programming can be made common with regard to the other sets (dispense buttons associated with the other outlets). To do so, an end user places the mode switch 42a or "rinse/run" switch in the "run" position, and directs the dispenser 10a to enter the "program" mode. Specifically, the end user directs the dispenser 10a to enter the "program" mode by pushing any two dispense buttons which have been programmed to the desired values. For example, if the end user has programmed the set 90 of dispense buttons 92, 94, 96 which are associated with the left outlet 12a and desires to carry the programmed values over to the other sets 100, 110 of dispense buttons, the end user directs the dispenser to enter the "program" mode by pushing any two dispense buttons 92, 94, 96 associated with the left outlet 12a. As such, the end user effectively communicates to the controller 50a that it is the programmed serving size values of the left outlet 12a which are to be carried over to the dispense buttons 102, 104, 106, 112, 114, 116 associated with the other outlets 14a and 16a. Then, the end user pushes and holds down the "stop" button 120 for ten seconds. After the ten second period, the controller 50a assigns the programmed values to the other dispense buttons 102, 104, 106, 112, 114, 116. After the ten second period, preferably indicator lights 140, 142, 144 on the door 26a illuminate solid indicating that the task is complete. Preferably, the dispenser 10a exits the "program" mode when the "stop" button 120 is released. Subsequently, each of the dispense buttons associated with a given serving size (such as 92, 102 and 104) are programmed such that generally the same amount of product is dispensed upon any of the given serving size dispense buttons being pushed. Of course, the dispenser 10a may still be configured such that a different type of product is dispensed from each outlet 12a, 14a, 16a even though the same serving sizes are dispensed.

Preferably, the programmed speeds of the hopper motors 70a, 72a, 74a can also be programmed by the end user using the dispense buttons 92, 94, 96, 102, 104, 106, 110, 112, 114. Specifically, the end user directs the dispenser to enter the "program" mode, and places the mode switch 42a in the "rinse" position. Then, the end user pushes and holds down the "stop" button 120 and pushes the dispense button 92, 102 or 112 associated with a "small" serving size to decrease the programmed speed of the associated hopper 70a, 72a or 74a, or presses the dispense button 96, 106, 116 associated with a "large" serving size to increase the programmed speed of the associated hopper 70a, 72a, 74a. Preferably, each time any dispense button is pushed, the substance dispense rate (i.e. the programmed speed of the associated auger motor 70a, 72a or 74a) is increased or decreased by two-and-a-half percent. Preferably, each time any dispense button is pushed, an indicator light 140, 142 or 144 on the door 26a corresponding to that particular outlet 12a, 14a or 16a flashes on and off to indicate that the pushing of the button has been recognized. Preferably, when a maximum or minimum value is reached, lights 140, 142, 144 associated with each of the outlets 12a, 14a, 16a flash rapidly.

Preferably, the controller 50a is configured such that after an end user programs the speed of one hopper motor 70a, 72a or 74a, the end user can direct the controller to apply the same setting to the other hopper motors. Specifically, the end user places the mode or "rinse/run" switch 42a in the "rinse" position. Then, the end user directs the dispenser 10a to enter the "program" mode. Specifically, the end user directs the dispenser 10a to enter the "program" mode by pushing any two dispense buttons associated with the hopper motor which has been programmed. For example, if the end user has programmed the speed of the auger motor 70a of the left outlet 12a and desires to carry the programmed values over to the other auger motors 72a and 74a, the end user directs the dispenser 10a to enter the "program" mode by pushing any two dispense buttons 92, 94, 96 associated with the left auger motor 70a, or left outlet 12a. As such, the end user effectively communicates to the controller 50a that it is the programmed motor speed of the left auger 70a which is to be carried over to the other auger motors 72a and 74a. Then, the end user pushes and holds down the "stop" button 120 for ten seconds. After the ten second period, the controller 50a applies the same hopper motor speed to the other hopper motors 72a and 74a. Preferably, after the ten second period, indicator lights 140, 142, 144 on the door 26a illuminate solid indicating that the task is complete. Preferably, the dispenser 10a exits the "program" mode when the "stop" button 120 is released. Subsequently, the controller 50a operates each of the auger motors 70a, 72a, 74a using the same programmed speed.

Preferably, the controller 50a is also configured such that an end user can run a "hopper throw test" wherein the dispensing machine 10a dispenses only substance, where the substance is not mixed with water, for a given period of time. In this way, the end user can readily determine the rate at which the dispensing machine 10a dispenses substance when a given dispense button is pushed. Specifically, the controller 50a may be configured such that the end user disassembles the mixing assembly 32a, 34a, 36a (specifically, by removing a steam collector (not shown) and a mixing chamber) which is under the hopper to be checked. Then, the user positions a container under the corresponding outlet 12a, 14a or 16a. Then, the end user directs the dispenser 10a to enter the "program" mode by pushing two dispense buttons corresponding to the hopper which the end user wants to check. Then, the end user places the mode switch 42a or "rinse/run" switch in the "run" position. Subsequently, the end user pushes and holds down the "stop" button 120 and pushes the dispense button which the end user wants to check. The controller operates the associated auger for the programmed time dispense period (i.e. the programmed time associated with that particular dispense button) and at the programmed dispense rate (i.e. the programmed speed associated with that particular auger motor). Then, the end user removes the container and weighs the dispensed substance. Finally, the end user directs the dispenser 10a to exit the "program" mode and reassembles the mixing assembly 32a, 34a, 36a.

Preferably, the controller 50a is initially programmed with default hopper speeds and serving sizes, and different values can be programmed by the end user as described above. It is also preferred that the controller 50a be configured to provide that an end user can return the settings to the default values. Specifically, the controller 50a may be programmed such that to re-set all the values to the factory or default settings, an end user disconnects the dispenser 10a from the power supply, places the mode switch 42a or "rinse/run" switch in the "run" position and pushes and holds certain dispense buttons and the "stop" button down at the same time. For example, the controller 50a may be configured such that the end user must push and hold down the "stop" button 120 and the dispense buttons associated the "small" serving size of the left and center outlets (buttons 94 and 104). Then, while holding down all these buttons, the end user must re-connect the dispenser 10a to the power supply. Once the buttons 94 and 104 have been held down for five seconds, the controller 50a re-sets all the values to the default values. When the task is completed, lights 140, 142, 144 associated with the outlets 12a, 14a, 16a and located on the door 26a may begin flashing until the buttons 94 and 104 are released. Preferably, the end user waits at least ten seconds before attempting to operate the dispenser 10a.

Both programmable dispensers 10 and 10a which have been described hereinabove provide numerous benefits due to their programmability. While embodiments of the present invention are shown and described, it is envisioned that those skilled in the art may devise various modifications and equivalents without departing from the spirit and scope of the appended claims. The invention is not intended to be limited by the foregoing disclosure. For example, different dispenser configurations and button and/or switch configurations and push sequences can be utilized without departing from the scope of the present invention.

What is claimed is:

1. A programmable dispenser which mixes a substance with water and dispenses a product, wherein a rate at which the dispenser dis substance is programmable, said programmable dispenser comprising:
   a substance dispensing device which dispenses the substance;
   a motor operably connected to said substance dispensing device;
   a controller operably connected to said motor and programmed to operate said motor at a programmed speed to dispense substance at a pre-determined rate;
   a dispense button in communication with said controller, said controller configured such that said dispense button is actuatable to alter said programmed speed to a new programmed speed to provide that said controller subsequently operates said motor at said new programmed speed to provide that said substance dispensing device dispenses substance at a different rate; and said controller being configured such that pressing and releasing said dispense button causes said controller to operate in an automatic mode wherein said controller operates said motor to provide that said substance dispensing device dispenses a pre-determined amount of substance, and said controller being configured such that pressing and holding down said dispense button causes said controller to operate in a manual mode wherein said controller operates said motor to provide that said substance dispensing device dispenses substance until said dispense button is released.

2. A programmable dispenser as recited in claim 1, said motor being a variable speed dc motor.

3. A programmable dispenser as recited in claim 1, further comprising a liquid level probe connected to said controller, said controller configured to calibrate said liquid level probe.

4. A programmable dispenser as recited in claim 1, said substance dispensing device being an auger disposed in a hopper, said substance being a powdered food substance.

5. A programmable dispenser which mixes a substance with water and dispenses a product, wherein an amount of substance which is dispensed into a given serving size of product is programmable, said programmable dispenser comprising:
   substance dispensing devices;
   motors operably connected to said substance dispensing devices;
   a controller operably connected to said motors;
   at least one dispense button and at least one programmed value changing switch associated with each motor and in communication with said controller, said controller configured such that actuation of said at least one dispense button causes said controller to operate the associated motor at a programmed speed to provide that the substance dispensing device to which the associated motor is operably connected dispenses a first amount of substance, said controller configured such that said at least one programmed value changing switch is actuatable to change said programmed speed to a new programmed speed to provide that subsequent actuation of said at least one dispense button causes said controller to operate the associated motor at said new programmed speed to provide that the substance dispensing device to which the associated motor is operably connected dispenses a different amount of substance; and said controller being configured such that pressing and releasing said at least one dispense button causes said controller to operate in an automatic mode wherein said controller operates the associated motor to provide that the substance dispensing device to which the associated motor is operably connected dispenses a pre-determined amount of substance, and said controller being configured such that pressing and holding down said at least one dispense button causes said controller to operate in a manual mode wherein said controller operated the associated motor to provide that the substance dispensing device to which the associated motor is operably connected dispenses substance until said at least one dispense button is released.

6. A programmable dispenser as recited in claim 5, each said motors being a variable speed dc motor.

7. A progranmable dispenser as recited in claim 5, further comprising a liquid level probe connected to said controller, said controller configured to calibrate said liquid level probe.

8. A programmable dispenser as recited in claim 5, each of said substance dispensing devices being an auger disposed in a respective hopper, said substance being at least one of coffee mix, chocolate powder and soup mix.

9. A programmable dispenser which mixes a substance with water and dispenses a product in a plurality of serving sizes depending on which one of a plurality of dispense buttons on the dispenser are pushed, wherein respective amounts of product which are dispensed upon the pushing of the dispense buttons on the dispenser are programmable, said programmable dispenser comprising:
   a substance dispensing device which dispenses the substance;
   a water line and dispense valve which dispenses water, said dispenser configured to mix and said substance and said water and dispense the product;
   a motor operably connected to said substance dispensing device;
   a controller operably connected to said motor and said dispense valve, said dispense buttons on said dispenser in communication with said controller, said controller programmed to operate said motor at a programmed speed for a period of time to dispense a desired amount of substance depending on which dispense button is pushed, said controller programmed to open said dispense valve for a programmed period of time to dispense a desired amount of water depending on which dispense button is pushed, said controller configured such that at least one of said dispense buttons is actuatable to change said programmed speed and said programmed period of time to provide that said programmable dispenser dispenses a different amount of product upon the pushing of a given dispense button;

and said controller being configured such that pressing and releasing at least one of said dispense buttons causes said controller to operate in an automatic mode wherein said controller operates the motor at a programmed speed to dispense a desired amount of substance, and said controller being configured such that pressing and holding down said dispense button causes said controller to operate in a manual mode wherein said controller operates the motor to provide that the substance dispensing device dispenses substance until said dispense button is released.

10. A programmable dispenser as recited in claim 9, said motor being a variable speed dc motor.

11. A programmable dispenser as recited in claim 9, further comprising a liquid level probe connected to said controller, said controller configured to calibrate said liquid level probe.

12. A programmable dispenser as recited in claim 9, said substance dispensing device being an auger disposed in a respective hopper, said substance being at least one of coffee mix, chocolate powder and soup mix.

13. A programmable dispenser which mixes a ubstance with water and dispenses a product, wherein an amount of substance which is dispensed into a given serving size of product is programmable, said programmable dispenser comprising:

substance dispensing devices;

motors operably connected to said substance dispensing devices;

a controller operably connected to said motors;

a dispense button on said dispenser and in communication with said controller, said controller configured to operate each motor at a respective programmed speed for a period of time to provide that each substance dispensing device dispenses a desired amount of substance, said controller configured such that said programmed speed relating to one motor is applied to at least one of the other motors upon actuation of said dispense button; and a stop button, said controller being configured to apply the programmed speed of one motor to the other motor upon the stop button being pushed and held down for a period of time.

* * * * *